(12) United States Patent
Suligoj et al.

(10) Patent No.: US 10,296,821 B2
(45) Date of Patent: May 21, 2019

(54) RFID DEVICES AND METHODS OF MAKING THE SAME

(71) Applicant: ASSA ABLOY AB, Stockholm (SE)

(72) Inventors: Eric Suligoj, Froideville (CH); Elies Ennabli, Lausanne (CH); Peter Kemarau, Bandar Putra (MY)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/679,886

(22) Filed: Aug. 17, 2017

(65) Prior Publication Data
US 2019/0057296 A1  Feb. 21, 2019

(51) Int. Cl.
*G06K 19/077* (2006.01)

(52) U.S. Cl.
CPC . *G06K 19/07773* (2013.01); *G06K 19/07718* (2013.01)

(58) Field of Classification Search
CPC .................... G06K 19/07773; G06K 19/07718
See application file for complete search history.

(56) References Cited

U.S. PATENT DOCUMENTS

| | | |
|---|---|---|
| 6,111,544 A | 8/2000 | Dakeya et al. |
| 6,914,562 B2 | 7/2005 | Forster |
| 7,256,739 B2 | 8/2007 | Usami |
| 7,342,498 B2 | 3/2008 | Baba et al. |
| 7,768,400 B2 | 8/2010 | Lawrence et al. |
| 7,880,619 B2 | 2/2011 | Brown et al. |
| 8,049,669 B2 * | 11/2011 | Yamazaki ........ G06K 19/07728 343/700 MS |
| 8,264,358 B2 | 9/2012 | Brown et al. |
| 8,299,927 B2 | 10/2012 | Lawrence et al. |
| 8,502,678 B2 | 8/2013 | Brown et al. |
| 9,104,952 B2 | 8/2015 | Lawrence et al. |

(Continued)

FOREIGN PATENT DOCUMENTS

| | | |
|---|---|---|
| EP | 1150311 | 10/2001 |
| EP | 1542309 | 6/2005 |

(Continued)

OTHER PUBLICATIONS

Kwon et al. "Compact slotted planar inverted-F RFID tag mountable on metallic objects," Electronics Letters, Nov. 24, 2005, vol. 41, No. 24, 1308-1310.

(Continued)

*Primary Examiner* — Sonji N Johnson
(74) *Attorney, Agent, or Firm* — Schwegman Lundberg & Woessner, P.A.

(57) ABSTRACT

An RFID device includes a substrate and an antenna. The antenna includes a first antenna section on a first side of the substrate and a second antenna section on the first side of the substrate and separated from the first antenna section by a non-conductive part of the substrate. The first antenna section includes a first plurality of vias that extend through the substrate from the first side of the substrate to a second side of the substrate. The antenna includes a third antenna section on at least the second side of the substrate to electrically connect conductive portions of the first plurality of vias to the second antenna section. The RFID device includes a circuit on the substrate and to process signals of the antenna.

20 Claims, 7 Drawing Sheets

(56) References Cited

U.S. PATENT DOCUMENTS

| | | |
|---|---|---|
| 2002/0167450 A1 | 11/2002 | Korden et al. |
| 2003/0122721 A1 | 7/2003 | Sievenpiper |
| 2005/0093677 A1 | 5/2005 | Forster et al. |
| 2006/0054710 A1 | 3/2006 | Forster et al. |
| 2006/0071792 A1 | 4/2006 | Caron et al. |
| 2006/0125703 A1 | 6/2006 | Ma et al. |
| 2007/0017986 A1 | 1/2007 | Carrender et al. |
| 2007/0188327 A1 | 8/2007 | Keeton et al. |
| 2008/0106379 A1 | 5/2008 | Haddock |
| 2008/0315992 A1 | 12/2008 | Forster |
| 2012/0268327 A1 | 10/2012 | Sardariani et al. |
| 2014/0187178 A1 | 7/2014 | Yang et al. |
| 2014/0191042 A1 | 7/2014 | Brown et al. |
| 2014/0361089 A1 * | 12/2014 | Kai .................. H01Q 1/38 235/492 |
| 2015/0145744 A1 | 5/2015 | Kao et al. |
| 2018/0181853 A1 | 6/2018 | Ennabli et al. |

FOREIGN PATENT DOCUMENTS

| | | |
|---|---|---|
| EP | 2033146 | 8/2011 |
| EP | 1907991 | 3/2012 |
| WO | WO 2004/088583 | 10/2004 |
| WO | WO 2011/141860 | 11/2011 |
| WO | WO-2011161302 A1 * | 12/2011 ....... G06K 19/07758 |
| WO | 2012177946 | 12/2012 |
| WO | WO 2016/198914 | 12/2016 |

OTHER PUBLICATIONS

Rao et al. "Antenna Design for UHF RFID Tags: A Review and a Practical Application," IEEE Transactions on Antennas and Propagation, Dec. 2005, vol. 53, No. 12, pp. 3870-3876.

Ukkonen et al. "A Novel Tag Design Using Inverted-F Antenna for Radio Frequency Identification of Metallic Objects," Advances in Wired and Wireless Communication, IEEE 2004, May 2004, 4 pages.

Official Action for U.S. Appl. No. 15/580,016, dated May 2, 2018 6 pages.

International Search Report and Written Opinion for International (PCT) Patent Application No. PCT/IB2015/054347, dated Feb. 12, 2016, 9 pages.

"European Application Serial No. 18189417.1, Extended European Search Report dated Jan. 16, 2019", 10 pgs.

* cited by examiner

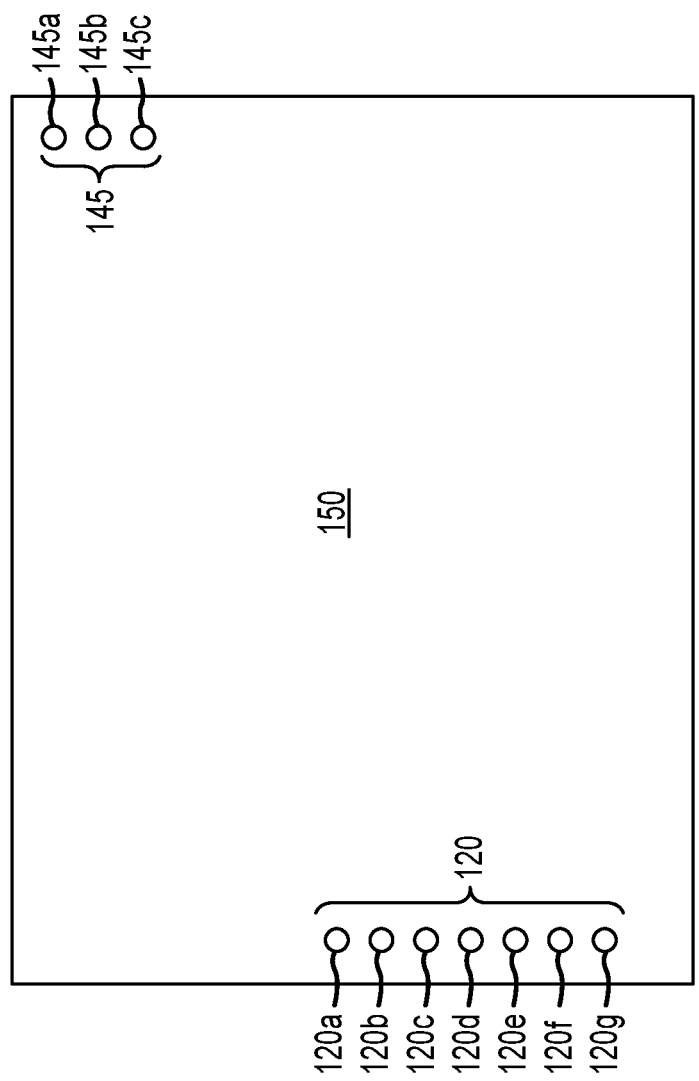

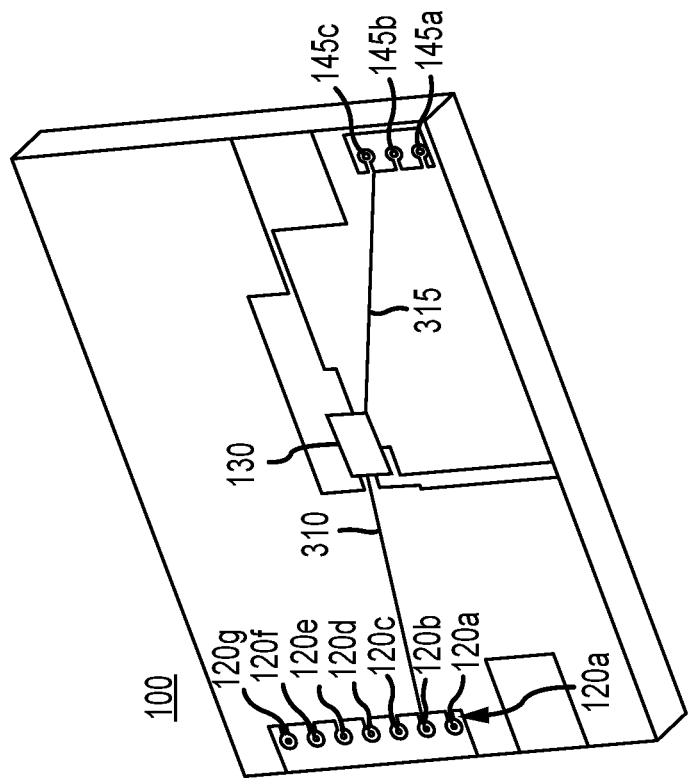
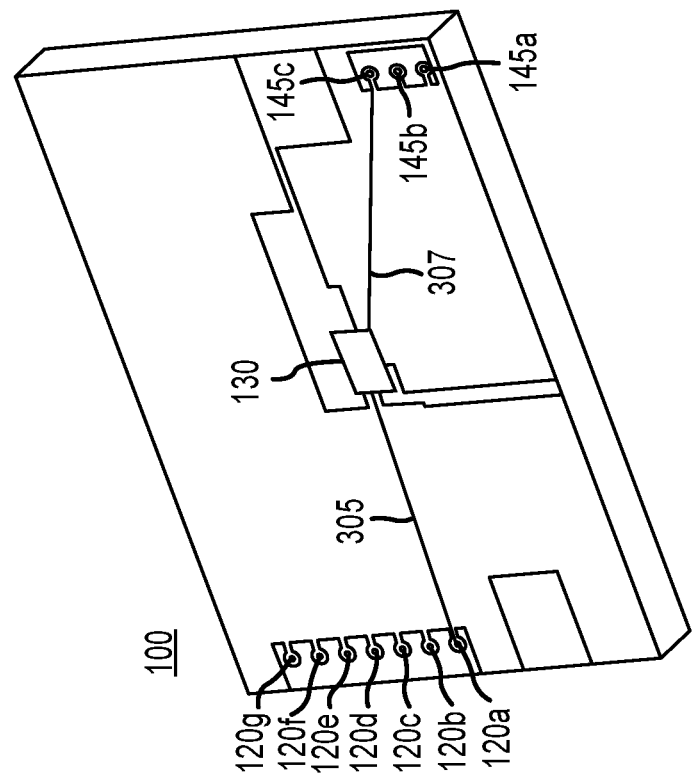
FIG. 3A
FIG. 3B

RFID DEVICES AND METHODS OF MAKING THE SAME

FIELD OF THE DISCLOSURE

The present disclosure relates to radio frequency identification (RFID) devices and/or methods of making the same.

BACKGROUND

RFID devices (e.g., ultra-high frequency (UHF) RFID devices) are employed in applications that include access networks, product identification, product tracking, and the like. These RFID devices include one or more antennas to receive and/or transmit wireless signals. RFID devices typically employ antennas with fixed operating frequencies (or resonant frequencies), meaning that the operating frequency (or resonant frequency) cannot be changed to account for the effects of the external environment and/or internal components. The electrical characteristics and performance of an RFID device and its antenna(s) are sensitive to the device's external environment (e.g., the operating environment) as well as components of the device itself (e.g., the packaging, the processing circuit of the RFID device, the manner in which the processing circuit is connected to the antenna, etc.). Tuning may also be affected by variation within a batch of chips, and from batch to batch. Changing the type of chip or even the way to connect the chip and antenna would have further impact.

SUMMARY

According to aspects of the present disclosure, an RFID device is provided with a tunable antenna. More precisely, the antenna may be trimmed or adjusted easily with reliable precision and repeatability. Such an antenna would simplify logistics and accelerate production flow. In the case of new design, one antenna may be constructed and subsequently tuned depending upon the application, environment and material used, without the need to create a new antenna for each configuration.

According to aspects of the present disclosure, a tunable antenna would be useful in case of production deviation or raw material moving away of their standard characteristic. Adjustment could be done at the beginning of the production using standard antenna from stock. In case of high precision tuning requirements from the application, or high variation within one material lot, appropriate trimming could be recalculated for each individual piece. Tuning could be adjusted depending of the final application too, for example, whenever the RFID tag is placed on a specific metallic material or plastic material tuning could be adjusted to optimize the performances. A single antenna could be optimized for different communication protocols/standards, such as frequency bands set by the European Telecommunications Standards Institute (ETSI) and/or the Federal Communications Commission (FCC). Similarly, an antenna could be adjusted to accommodate specific housing material change with minimum of effort and investment while material would remain the same and thus available from stock. This could be also used to keep the same antenna platform while adjusting the trim to a different chip used or different assembly that could affect the tuning, for example, parasitic capacitance of Flip Chip process, vs module assembly, vs Chip On Board connection.

At least one example embodiment is directed to an RFID device comprising a substrate and a tunable antenna. The antenna includes a first antenna section on a first side of the substrate. The first antenna section includes a first plurality of vias that extend through the substrate from the first side of the substrate to a second side of the substrate. The antenna includes a second antenna section on the first side of the substrate and separated from the first antenna section by a non-conductive part of the substrate. The antenna includes a third antenna section on at least the second side of the substrate to electrically connect conductive portions of the first plurality of vias to the second antenna section. The RFID device includes a circuit on the substrate and to process signals of the antenna. The circuit includes a first terminal electrically connected to the first antenna section and a second terminal electrically connected to the second antenna section.

According to at least one example embodiment, the first, second, and third antenna sections are planar.

According to at least one example embodiment, the RFID device further includes a protective material that encases the circuit and the first, second, and third antenna sections and exposes the first plurality of vias.

According to at least one example embodiment, the first plurality of vias are separated from one another on the first side by the substrate and electrically connected to the first antenna section by respective first conductive traces on the first side of the substrate.

According to at least one example embodiment, the first plurality of vias comprise at least one of i) through holes with conductive sidewalls to electrically connect the respective first conductive traces to the third antenna section and ii) through holes with opposing conductive first and second sidewall end sections separated from one another by the substrate, the first side wall end sections being electrically connected to the first antenna section and the second sidewall end sections being electrically connected to the third antenna section, the first and second sidewall end sections being electrically connectable by a conductive element or insert, such as a rod, to electrically connect the respective first conductive traces to the third antenna section.

According to at least one example embodiment, a location of each of the first plurality of vias is associated with one of multiple different operating frequencies of the antenna.

According to at least one example embodiment, the antenna has an initial operating frequency that is greater than the multiple different operating frequencies.

According to at least one example embodiment, the second antenna section further comprises at least one via that extends through the substrate to the third antenna section.

According to at least one example embodiment, the at least one via is a second plurality of vias separated from one another by the substrate and electrically connected to the second antenna section by respective second conductive traces on the first side of the substrate.

According to at least one example embodiment, the at least one via is a second plurality of vias that comprise at least one of i) through holes with conductive sidewalls to electrically connect the respective second conductive traces to the third antenna section and ii) through holes with opposing conductive third and fourth sidewall end sections separated from one another by the substrate, the third side wall end sections being electrically connected to the second antenna section and the fourth sidewall end sections being electrically connected to the third antenna section, the third and fourth sidewall end sections being electrically connectable by a conductive insert or element, such as a rod, to electrically connect the respective second conductive traces to the third antenna section.

According to at least one example embodiment, a location of each of the second plurality of vias is associated with one of multiple different operating frequencies of the antenna.

At least one example embodiment is directed to a tunable antenna for an RFID device, comprising a first antenna plate on a first side of a substrate. The first antenna plate includes a first plurality of vias that extend through the substrate from the first side of the substrate to a second side of the substrate. The tunable antenna includes a second antenna plate on the first side of the substrate and separated from the first antenna plate by a portion of the substrate. The tunable antenna includes a third antenna plate on at least the second side of the substrate to electrically connect the first plurality of vias to the second antenna plate.

According to at least one example embodiment, a location of each of the first plurality of vias is associated with one of multiple different operating frequencies of the antenna.

According to at least one example embodiment, the second antenna plate further comprises a second plurality of vias that extend through the substrate from the first side to the second side.

According to at least one example embodiment, the first plurality of vias are separated from one another by the substrate and electrically connected to the first antenna plate by first respective conductive traces on the first side of the substrate, wherein the second plurality of vias are separated from one another by the substrate and electrically connected to the second antenna plate by respective second conductive traces on the first side of the substrate.

According to at least one example embodiment, one or more of the first plurality of vias and one or more of the second plurality of vias comprise at least one of i) through holes with conductive sidewalls to electrically connect the first and second respective conductive traces to the third antenna section and ii) through holes with opposing conductive sidewall end sections separated from one another by the substrate, the sidewall end sections being electrically connectable by a conductive insert or element, such as a rod, to electrically connect the first and second respective traces to the third antenna section.

At least one example embodiment is directed to a method of manufacturing an RFID device that includes forming a first plurality of vias through a substrate at locations on the substrate associated with different operating frequencies of the antenna. The method includes forming a first antenna plate on a first surface of the substrate in an area that includes the first plurality of vias. The method includes forming a second antenna plate on the first surface of the substrate such that the second antenna plate and the first antenna plate are electrically isolated from one another on the first surface. The method includes forming a third antenna plate on a second surface of the substrate that is opposite to the first surface such that the third antenna plate electrically connects the first plurality of vias to the second antenna plate.

According to at least one example embodiment, the forming the first antenna plate includes forming a conductive material on sidewalls of the first plurality of vias.

According to at least one example embodiment, the method further comprises changing an electrical connection between the conductive material and the first antenna plate to adjust an initial operating frequency of the antenna to one of the different operating frequencies.

According to at least one example embodiment, the changing the electrical connection includes at least one of i) removing a conductive trace that connects the first antenna plate to the conductive material, ii) removing the conductive material on the sidewalls, iii) inserting a conductive insert or element, such as a rod, into at least one of the first plurality of vias, and iv) removing a conductive element or insert, such as a rod, from at least one of the first plurality of vias.

According to at least one example embodiment, the method further comprises forming a second plurality of vias through the substrate at locations on the substrate associated with the different operating frequencies of the antenna. The method includes forming the second antenna plate in an area that includes the second plurality of vias. Forming the second antenna plate includes forming a conductive material on sidewalls of the second plurality of vias. The method includes changing an electrical connection between the conductive material and the second antenna plate to adjust an initial operating frequency of the antenna to one of the different operating frequencies by at least one of i) removing a conductive trace that connects the second antenna plate to the conductive material, ii) removing the conductive material on the sidewalls, iii) inserting a conductive element or insert, such as a rod, into at least one of the second plurality of vias, and iv) removing a conductive rod from at least one of the second plurality of vias.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

The tuning of an antenna in an RFID device varies depending of the physical construction and variations such as mechanical tolerances of the antenna (e.g., the conductive area of the antenna) as well as the dielectric values and tolerances of the substrate and surrounding material such as packaging, which can vary from batch to batch during production. The integrated circuit (IC) chip could also affect the tuning of the antenna and also has variations within different batches. Changing the type of the IC chip or even the way to connect it to the antenna would have further impact too.

BRIEF DESCRIPTION OF THE DRAWINGS

The present disclosure is described in conjunction with the appended figures, which are not necessarily drawn to scale. It should be understood, of course, that the invention is not necessarily limited to the particular embodiments illustrated herein.

FIG. 2 illustrates a bottom view of the RFID device in FIG. 1 according to at least one example embodiment;

FIGS. 3A-3B illustrate tuning the antenna in the RFID device of FIGS. 1 and 2 according to at least one example embodiment;

DETAILED DESCRIPTION

Figure 1:
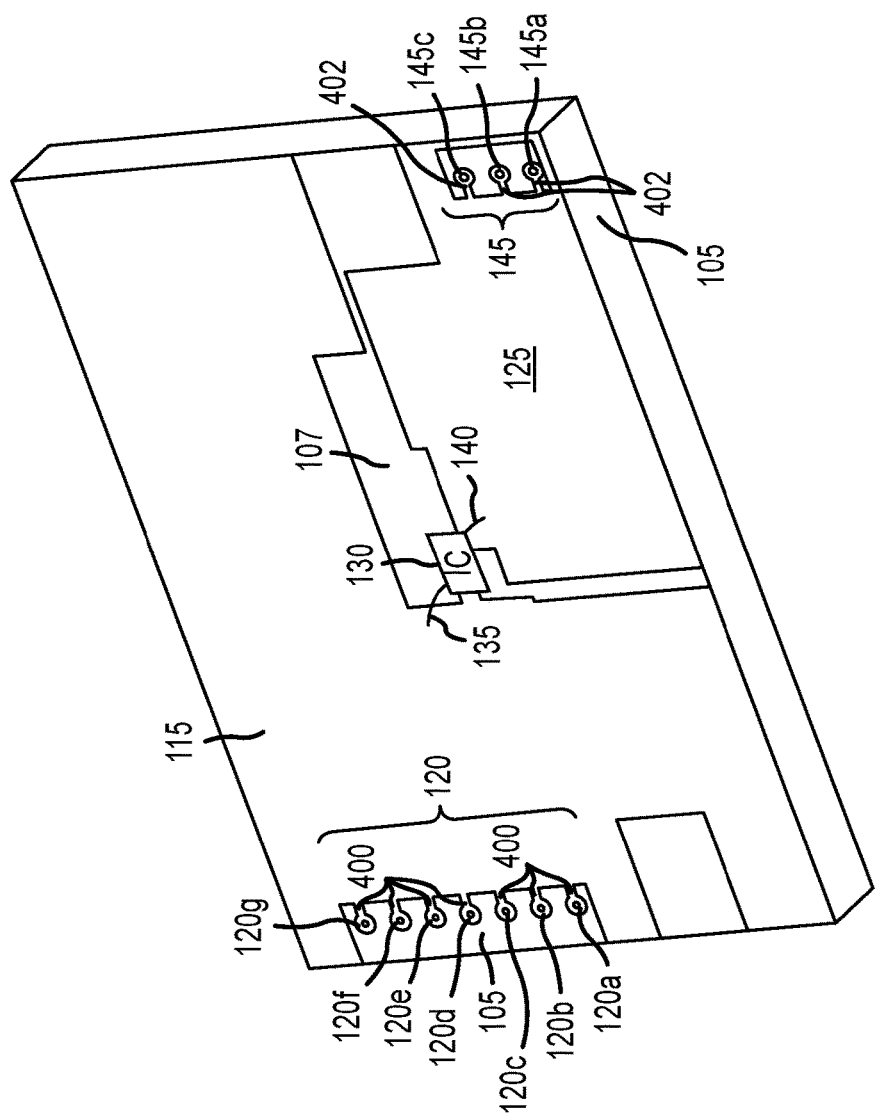
FIG. 1 illustrates a perspective view of an RFID device according to at least one example embodiment.

FIGS. 1 and 2 illustrate an RFID device 100 according to at least one example embodiment. The RFID device 100 comprises a substrate 105. The substrate 105 may be non-conductive/insulative printed circuit board (PCB). For example, the substrate 105 may be a PCB made of FR-4, a composite material composed of woven fiberglass cloth with an epoxy resin binder that is flame resistant. The RFID device 100 includes an antenna comprised of a first antenna section (or first antenna plate) 115, a second antenna section (or second antenna plate) 125, and a third antenna section (or third antenna plate) 150 (see FIG. 2). According to at least one embodiment, the RFID device 100 may be about 30 mm wide, about 40 mm long, and about 3 mm thick. However, these dimensions may vary according to design preferences.

As shown in FIGS. 1 and 2, the first antenna section 115 is on a first side of the substrate 105. The first antenna section includes a first plurality of vias 120 (i.e., 120a-120g) that extend through the substrate 105 from the first side of the substrate to a second side of the substrate 105. The second antenna section is on the first side of the substrate and separated from the first antenna section by a non-conductive part of the substrate 107 (noting that the entire substrate 105 may also be non-conductive). As shown in FIG. 2, the third antenna section 150 is on at least the second side of the substrate 105 to electrically connect conductive portions of the first plurality of vias 120 to the second antenna section 125. In other words, the first antenna section 115, the second antenna section 125 and the third antenna section 150 are electrically connected to one another to form the complete antenna. The connections between the third antenna section 150, the first plurality of vias 120 and the second antenna section 125 are described in more detail below with reference to FIGS. 3-5.

FIG. 1 further illustrates a circuit 130 on the substrate 105. The circuit 130 may be an integrated circuit (IC) (e.g., an application specific IC (ASIC)), microprocessor executing instructions on a computer readable medium, and/or the like that processes incoming and outgoing signals (e.g., wireless signals) of the antenna. The circuit 130 includes a first terminal 135 electrically connected to the first antenna section 115 and a second terminal 140 electrically connected to the second antenna section 125 (e.g., by wire bonds as shown, or by conductive traces, and/or other suitable electrical connections as would be known to those of ordinary skill in the art). As shown in FIG. 1, the circuit 130 may be attached to or positioned over the non-conductive part of the substrate 107. However, example embodiments are not limited thereto and the circuit 130 may be located on or embedded fully or partially in the substrate 105 at some other desired location. In view of the above, it should be understood that the circuit 130 communicates with one or more external devices (e.g., a corresponding RFID reader or RFID tag) through the antenna. The RFID device 100 may be an active device where the circuit 130 is powered by an onboard power supply. Alternatively, the RFID device 100 may be a passive device, where the circuit 130 draws power from the external environment through the antenna (e.g., when the RFID device 100 is in the presence of a corresponding RFID reader or tag).

As shown in FIGS. 1 and 2, the first, second, and third antenna sections 115, 125, and 150 are planar. In at least one example embodiment, the antenna sections are sheets of conductive material, such as copper or other suitable antenna material. The size, material, and shape of the antenna sections 115, 125, and 150 are design parameters set based on empirical evidence and/or user preference and may vary according to the desired operating frequency or range of operating frequencies of the antenna.

In at least one example embodiment, the second antenna section 125 further comprises at least one via that extends through the substrate 105 to the third antenna section 150. FIGS. 1 and 2 illustrate that the at least one via is a second plurality of vias 145 (i.e., 145a-145c), however, it should be understood that a single via in the second antenna section 125 is appropriate if desired. The first plurality of vias 120 and the second plurality of vias 145 have substantially the same structure and are formed in substantially the same manner. FIGS. 4-7 discuss the possible via structures and methods of forming the vias 120 and 145 in more detail.

Figure 4:
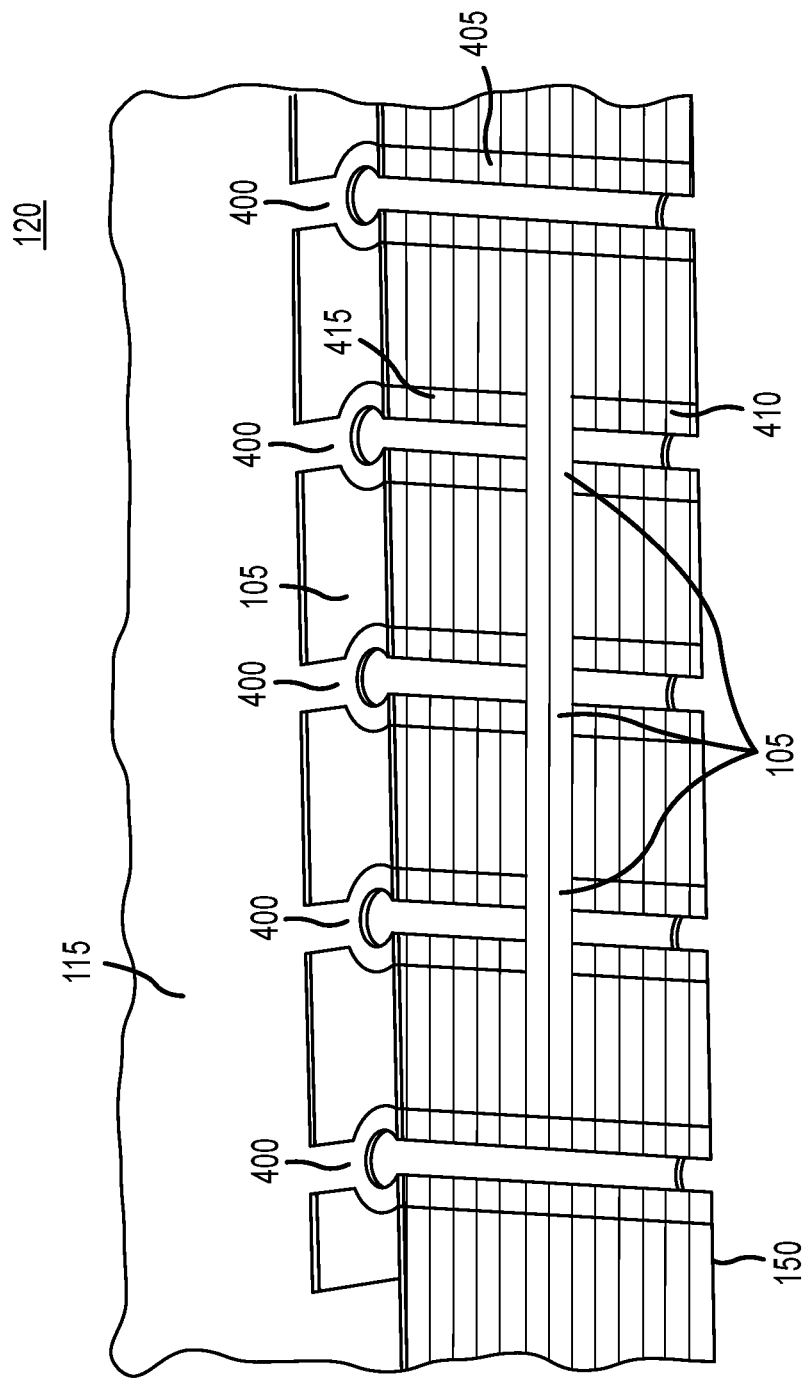
FIG. 4 illustrates an example of a plurality of vias in the antenna plate(s) of FIGS. 1-3 according to at least one example embodiment.
Figure 5:
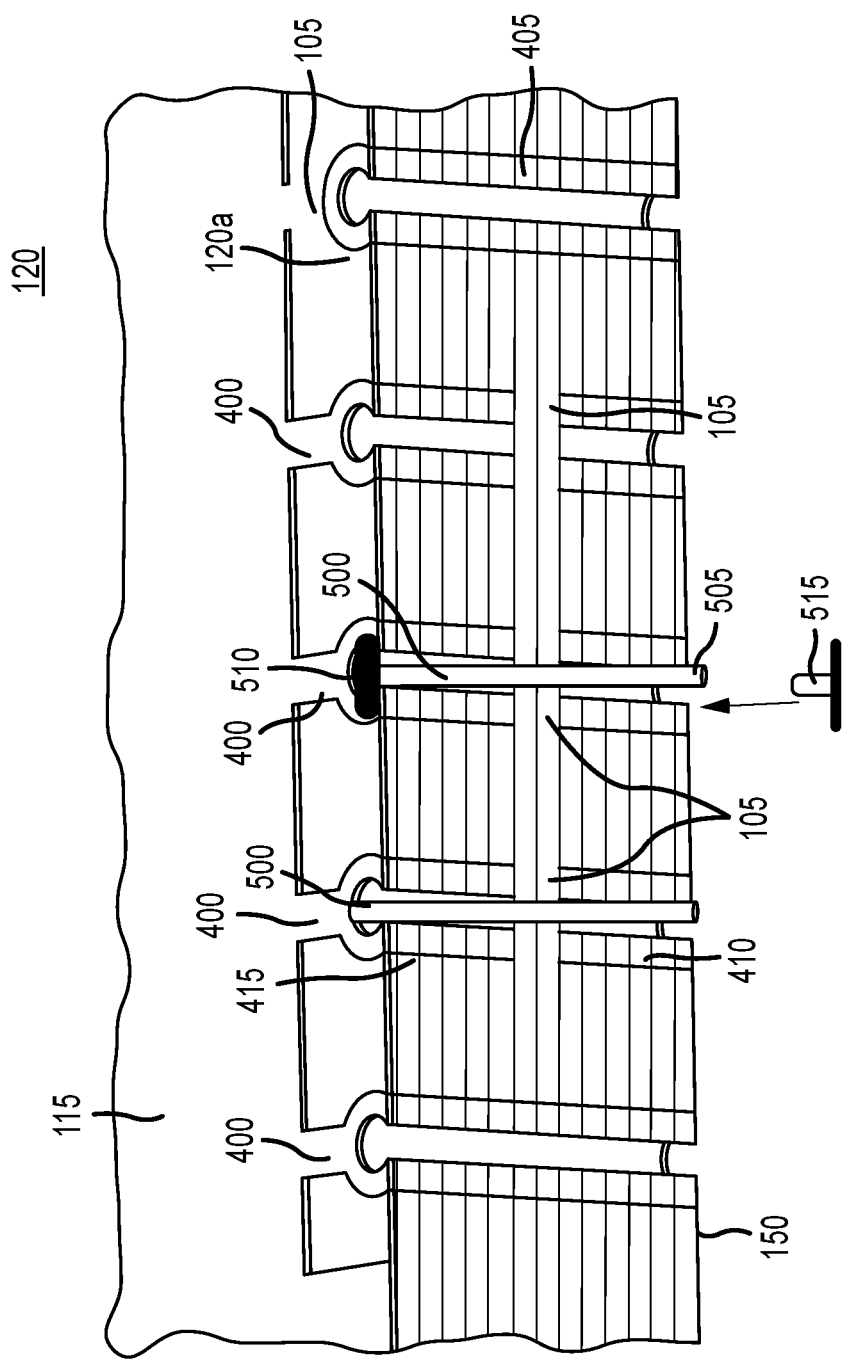
FIG. 5 illustrates examples for tuning the antenna of FIGS. 1-4 according to at least one example embodiment.

As shown in FIG. 1, the first plurality of vias 120 are separated from one another on the first side by the substrate 105 and electrically connected to the first antenna section 115 by respective conductive traces 400 on the first side of the substrate 105 (see FIGS. 4 and 5). Similarly, the second plurality of vias 145 are separated from one another by the substrate 105 and electrically connected to the second antenna section 125 by respective conductive traces 402 on the first side of the substrate 105. As shown in FIG. 2, the vias 120 and 145 on the second side of the substrate 105 are in electrical contact with the third antenna section 150.

FIGS. 3A and 3B illustrate an example of tuning the antenna from one operating frequency to a different operating frequency. With reference to FIGS. 1-3B, a location of each of the first plurality of vias 120 is associated with one of multiple different operating frequencies of the antenna. Likewise, a location of each of the second plurality of vias 145 is associated with one of multiple different operating frequencies of the antenna. The initial operating frequency and the multiple different operating frequencies are design parameters set based on empirical evidence and/or user preference.

In operation of the RFID device 100, electrical signals travel through antenna sections 115, 125, and 150 along the shortest electrical path available in the antenna. The locations and structure of the vias 120 and 145 allow for the operating frequency of the antenna to be adjusted by changing the electrical connection between the vias 120 and 145 and their respective antenna sections 115 and 125. For example, FIG. 3A shows an initial electrical path (i.e., shortest electrical path) between the circuit 130 and the vias 120 and 145. In more detail, the initial electrical path 305 is from circuit 130 through the bottommost via 120a to the third antenna section 150, up through the topmost via 145c, and back to the circuit 130 by path 307. In FIG. 3A, the antenna has the initial operating frequency (e.g., 880 MHz).

FIG. 3B illustrates trimming a conductive trace of a selected one of the vias 120a (i.e., the bottommost via), thereby changing the electrical connection between the selected via 120a and the first antenna section 125 by insulating the selected via from the first antenna section 125. As a result, the shortest electrical path is now through the via 120b adjacent to the trimmed via 120a. That is, the new electrical path is from circuit 130 through the via 120b along path 310 to the third antenna section 150, up through the topmost via 145c, and back to the circuit 130 by path 315. This changes the operating frequency of the antenna from the initial operating frequency to one of the multiple different operating frequencies. In other words, the antenna is tuned to a different operating frequency. In this example, the electrical path lengthened from FIG. 3A to FIG. 3B, which lowers the operating frequency of the antenna from the initial operating frequency associated with the trimmed via to the operating frequency associated with the adjacent via. Thus, it may be said that the initial operating frequency is greater than the multiple different operating frequencies.

FIGS. 1-3B illustrate a same pitch (e.g., about 1 mm) between each via in the first and second plurality of vias 120 and 145 and the locations of the vias 120 and 145 as being in opposing corners of the RFID device 100 because doing so allows for flexibility in tuning the antenna to the desired operating frequency. As a result of identical pitches between vias, the change in operating frequency for each via is also the same (e.g., a change of 10-15 MHz between a via and an immediately adjacent via). For example, one via may be associated with an operating frequency of 880 MhZ while the immediately adjacent via has an associated operating frequency of 865 MHz. This variation in frequency is maintained for each subsequent via. However, example embodiments are not limited thereto and the pitch between vias and locations of the vias may vary according to design preferences, such as a desired range of operating frequencies of the antenna.

It should be further understood that although FIGS. 1-3B illustrate both antenna sections 115 and 125 as having vias 120 and 145, the vias can be omitted from either the first antenna section 115 or the second antenna section 125. For example, if the second antenna plate 125 does not include vias 145, then the second antenna section 125 and the third antenna section 150 are electrically connected to one another by a different means, such as a conductive trace or wire bonding on an outer sidewall of the substrate 105. Alternatively, the second antenna section 125 and the third antenna section 150 may be a unitary structure that wraps around one or more sidewalls of the substrate 105.

In another example, if the first antenna section 115 does not include the vias 120, then the first antenna section 115 and the third antenna section 150 are electrically connected to one another by a different means, such as a conductive trace or wire bonding on an outer side wall of the substrate 105. Alternatively, the first antenna section 115 and the third antenna section 150 may be a unitary structure that wraps around one or more sidewalls of the substrate 105.

In view of FIGS. 1-3B, it may be said that example embodiments relate to a tunable antenna for an RFID device 100. The tunable antenna comprises a first antenna plate 115 on a first side of a substrate 105. The first antenna plate 115 includes a first plurality of vias 120 that extend through the substrate 105 from the first side of the substrate to a second side of the substrate 105. The tunable antenna includes a second antenna plate 125 on the first side of the substrate 105 and separated from the first antenna plate 115 by a portion of the substrate 107. The tunable antenna includes a third antenna plate 150 on at least the second side of the substrate 105 to electrically connect the first plurality of vias 120 to the second antenna plate 125. That is, the first, second, and third antenna plates 115, 125, and 150 and the vias 120 include conductive portions electrically connected to one another to form the tunable antenna.

Further, although FIGS. 3A and 3B illustrate decreasing the operating frequency of the antenna by trimming a conductive trace connected to the vias 125, example embodiments are not limited to trimming conductive traces and decreasing the operating frequency. FIGS. 4 and 5 illustrate other examples for changing the electrical connections between the antenna sections and the vias to decrease and/or increase the operating frequency.

FIG. 4 illustrates an example of a plurality of vias in the antenna section(s) of FIGS. 1-3B according to at least one example embodiment. FIG. 5 illustrates examples for tuning the antenna of FIGS. 3 and 4 according to at least one example embodiment. FIGS. 4 and 5 show closeup views of the first plurality of vias 120, however, the illustrated structures and concepts also apply to the second plurality of vias 145 if desired.

As shown in FIGS. 4 and 5, the first plurality of vias 120 are separated from one another on the first side by the substrate 105 and electrically connected to the first antenna section 115 by respective conductive traces 400 on the first side of the substrate 105. In the same manner, the second plurality of vias 145 are separated from one another by the substrate 105 and electrically connected to the second antenna section 125 by respective conductive traces 402 on the first side of the substrate 105. In at least one other example embodiment, the conductive traces 400 and/or 402 are formed on the second side of the substrate 105 and connected to the third antenna section 150. That is, the structures of the vias 120/145 shown in FIGS. 4 and 5 are located on the same side of the substrate 105 as the third antenna section 150 instead of on the same side of the substrate as the first and second antenna sections 115/125.

FIGS. 4 and 5 further illustrate that the vias 120 may comprise through holes with conductive sidewalls 405 to electrically connect the respective conductive traces 400 to the third antenna section 150. Here, the electrical connection between the first antenna section 115 and the vias 120 is changeable by trimming the conductive trace 400. The trimming can be accomplished with a suitable cutting tool or drilling tool. Additionally or alternatively, the electrical connection can be changed by removing the conductive material from the conductive sidewalls 405 by drilling, for example.

As also shown in FIGS. 4 and 5, the vias may comprise through holes with opposing conductive sidewall end sections 410/415 separated from one another by the substrate 105. In this case, FIG. 5 shows the sidewall end sections 410/415 are electrically connectable by a removable conductive element or insert, such as a rod 500, to electrically connect the respective traces 400 to the third antenna section 150. The rod 500 may be comprised of a metal or other suitable conductive material. As shown in FIG. 5, the conductive rod 500 can include a stopper 510 at one end. The stopper 510 is of a size and shape that prevents the rod 500 from being pushed/pulled through the substrate 105. Additionally or alternatively, the rod 500 can include at least one hollow end 505 to receive a removable cap 515. The cap 515 may be conductive and can be inserted into the hollow end 505 and is of a size and shape that prevents the rod 500 from being pushed/pulled through the substrate 105. The cap 515 may be held in place by friction force. If the rod 500 includes both the stopper 510 and the hollow end/cap 505/515, it is possible to completely secure the rod 500 in the via. Alternatively, the rod 500 can be of a size and shape that fits snugly into the via without the stopper 510 and/or the cap 515. Example embodiments that employ the conductive rod 500 with vias that have conductive sidewall end sections 410/415 separated from one another by the substrate 105 allow for the operating frequency of the antenna to be easily increased as well as decreased. For example, if the RFID device 100 initially includes a conductive rod 500 for each via have the above structure, then the rods can be removed or inserted at will to raise or lower the operating frequency of the antenna as desired.

It should be appreciated that the vias 120/145 and conductive rods 500 may be formed according one of the above described structures or a combination of the above described structures depending on design preferences. Moreover, example embodiments not limited to the use of rods. For example, the removable conductive element or insert may include a conductive polymer or paste, which can be formed into a rod 500 before insertion into the vias 120/145 or filled into the vias 120/145. In the case of the conductive polymer/paste being filled into the vias, the polymer or paste can be removed by drilling, heat, etc.

Figure 6:
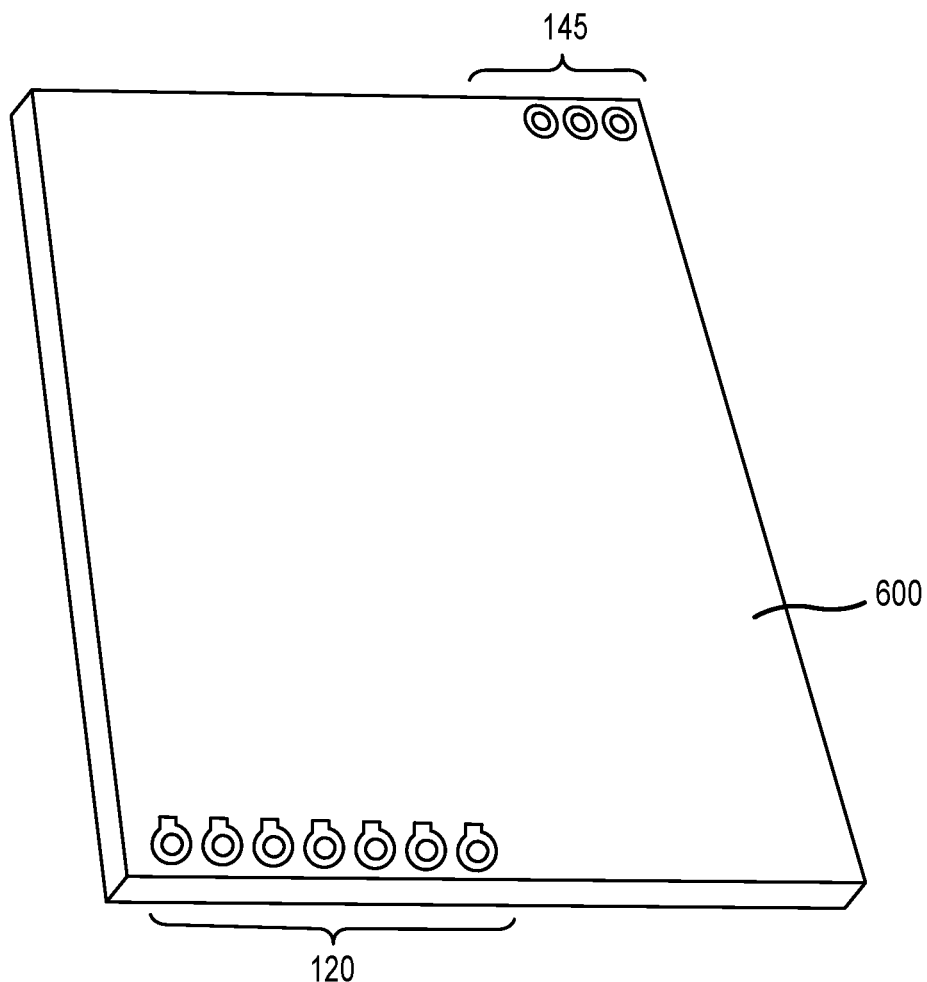
FIG. 6 illustrates an assembled RFID device according to at least one example embodiment.

FIG. 6 illustrates an assembled RFID device 100 according to at least one example embodiment. In particular, FIG. 6 illustrates that the RFID device 100 may include a protective material 600 that encases the circuit 130 and the first, second, and third antenna sections 115, 125, and 150 and exposes the first plurality of vias 125 and the second plurality of vias 145. The protective material may be a solder mask or other protectant typically used in PCB devices (e.g., a polymer).

Figure 7:
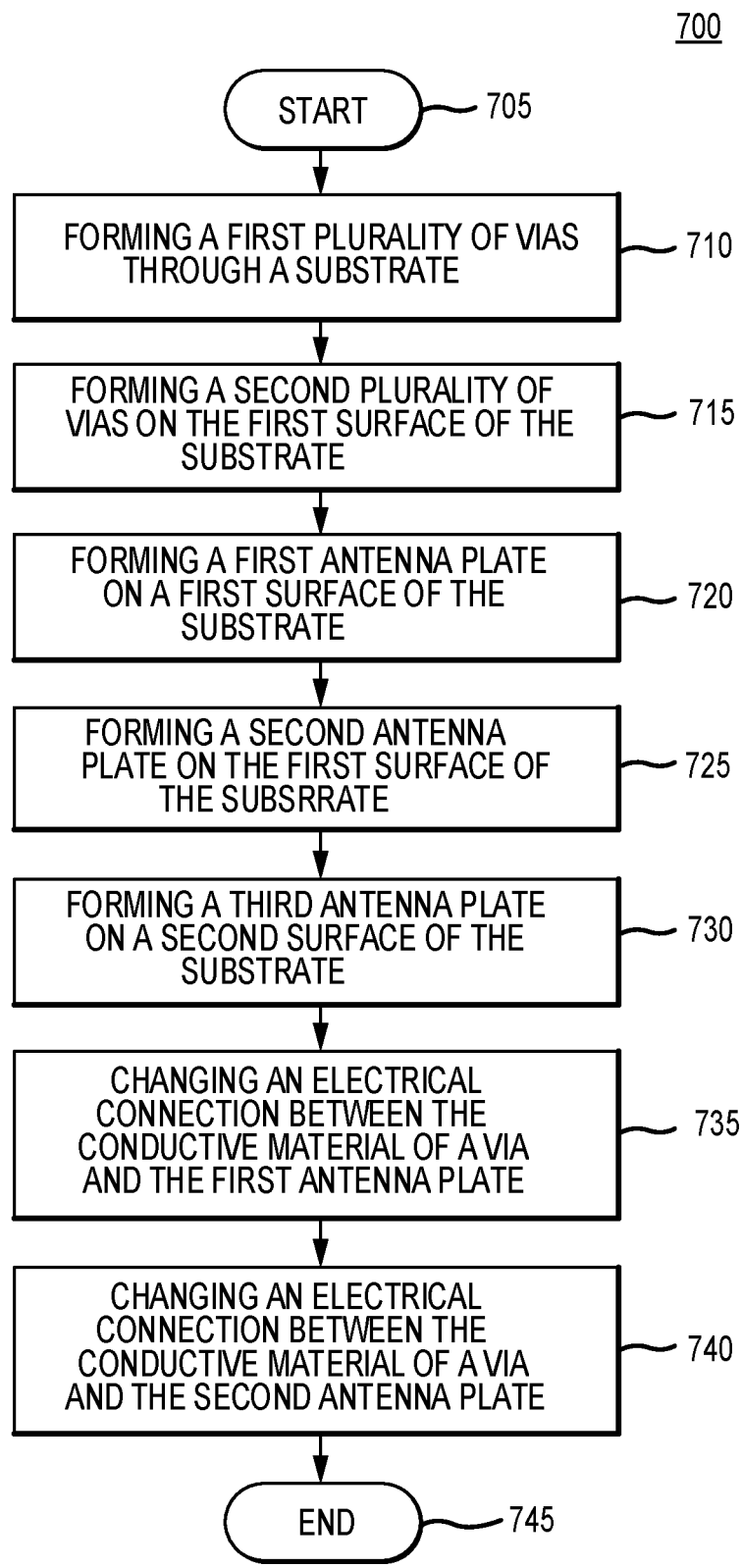
FIG. 7 is a flow chart illustrating a method of manufacturing the RFID device in FIGS. 1-6.

FIG. 7 illustrates example operations for manufacturing an RFID device according to at least one example embodiment. FIG. 7 is a flow diagram of a method 700 for forming the RFID device 100 described with respect to FIGS. 1-6. While a general order for the steps of the method is shown in FIG. 7, the method can include more or fewer steps or can arrange the order of the steps differently than those shown in FIG. 7. Generally, the method 700 starts at operation 705 and ends at operation 745. Hereinafter, FIG. 7 shall be explained with reference to the systems, components, assemblies, devices, user interfaces, environments, software, etc. described in conjunction with FIGS. 1-6.

In operation 710, the method 700 includes forming a first plurality of vias 120 through a substrate 105 at locations on the substrate 105 associated with different operating frequencies of an antenna of the RFID device 100. The vias 120 may be formed according to any suitable process, such as drilling, chemical etching, photolithography, etc.

In operation 715, the method 700 includes forming a second plurality of vias 145 through the substrate 105 at locations on the substrate 105 associated with the different operating frequencies of the antenna.

In operation 720, the method 700 includes forming a first antenna plate 115 on a first surface of the substrate 105 in an area that includes the first plurality of vias 120. The forming the first antenna plate 115 may include forming a conductive material (e.g., copper) on sidewalls 405 of the first plurality of vias 120 (see FIGS. 4 and 5, for example).

In operation 725, the method 700 includes forming the second antenna plate 125 in an area that includes the second plurality of vias 145. The forming the second antenna plate 125 may include forming a conductive material (e.g., copper) on sidewalls of the second plurality of vias 145. The second antenna plate 125 is formed on the first surface of the substrate 105 such that the second antenna plate 125 and the first antenna plate 115 are electrically isolated from one another on the first surface.

In operation 730, the method 700 includes forming a third antenna plate 150 on a second surface of the substrate 105 that is opposite to the first surface such that the third antenna plate 150 electrically connects the first plurality of vias 120 to the second antenna plate 125.

The first, second, and third antenna plates 115, 125, and 150 may be formed of a conductive material such as copper, and may be formed on the substrate 105 using chemical vapor deposition (CVD), electroplating (or electrodeposition), an inkjet process that employs conductive ink, etc.

In operation 735, the method 700 includes changing an electrical connection between the conductive material and the first antenna plate 115 to adjust an initial operating frequency of the antenna to one of the different operating frequencies. The changing the electrical connection includes at least one of i) removing a conductive trace 400 that connects the first antenna plate 115 to the conductive material 405, ii) removing the conductive material on the sidewalls 405, iii) inserting a conductive element 500 into at least one of the first plurality of vias 120, and iv) removing a conductive element 500 from at least one of the first plurality of vias 120.

In operation 740, the method 700 includes changing an electrical connection between the conductive material 405 and the second antenna plate 125 to adjust an initial operating frequency of the antenna to one of the different operating frequencies by at least one of i) removing a conductive trace 400 that connects the second antenna plate 125 to the conductive material 405, ii) removing the conductive material on the sidewalls 405, iii) inserting a conductive element 500 into at least one of the second plurality of vias 145, and iv) removing a conductive element 500 from at least one of the second plurality of vias 145.

It should be understood that operations 715 and 740 are optional operations that can be omitted from the method 700 if only one set of vias is desired for the RFID device 100. In this case, it should be understood that operation(s) 725/730 may include forming an electrical connection between the third antenna plate 150 and the second antenna plate 125. For example, the third antenna plate 150 may be formed such that a conductive trace extends from the second side of the substrate 105 to the second antenna plate 125.

Although not explicitly shown, the method 700 may also include an operation of forming a protective material 600 that encases the circuit 130 and the first, second, and third antenna plates 115, 125, and 150 and exposes the first plurality of vias 125 and/or the second plurality of vias 145. The protective material 600 may be a solder mask or other protectant typically used in PCB devices (e.g., a polymer).

In view of the foregoing description, it should be appreciated that example embodiments provide for RFID devices with tunable antennas. This allows for the operating frequency (or resonant frequency) of the antenna to be adjusted depending on the application and/or to account for the effects external and internal factors.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An RFID device, comprising:
a substrate;
an antenna including:
a first antenna section on a first side of the substrate, the first antenna section including a first plurality of vias that extend through the substrate from the first side of the substrate to a second side of the substrate;
a second antenna section on the first side of the substrate and separated from the first antenna section by a non-conductive part of the substrate; and
a third antenna section on at least the second side of the substrate to electrically connect conductive portions of the first plurality of vias to the second antenna section; and
a circuit on the substrate and to process signals of the antenna, the circuit including a first terminal electrically connected to the first antenna section and a second terminal electrically connected to the second antenna section,
wherein a location of each of the first plurality of vias is associated with one of multiple different operating frequencies of the antenna,
wherein the multiple different operating frequencies include an initial operating frequency associated with one of the first plurality of vias, and
wherein the initial operating frequency is greater than a remainder of the multiple different operating frequencies that are associated with remaining ones of the first plurality of vias.

2. The RFID device of claim 1, wherein the first, second, and third antenna sections are planar, and wherein the third antenna section is electrically connected the second antenna section and at least one conductive portion of the first plurality of vias.

3. The RFID device of claim 1, further comprising:
a protective material that encases the circuit and the first, second, and third antenna sections and exposes the first plurality of vias.

4. The RFID device of claim 1, wherein the first plurality of vias are separated from one another on the first side by the substrate and electrically connected to the first antenna section by respective first conductive traces on the first side of the substrate.

5. The RFID device of claim 4, wherein the first plurality of vias comprise at least one of i) through holes with conductive sidewalls to electrically connect the respective first conductive traces to the third antenna section and ii) through holes with opposing first and second conductive sidewall end sections separated from one another by the substrate, the first sidewall end sections being electrically connected to the first antenna section and the second sidewall end sections being electrically connected to the third antenna section, the first and second conductive sidewall end sections being electrically connectable by a conductive element to electrically connect the respective first conductive traces to the third antenna section.

6. The RFID device of claim 1, wherein the first plurality of vias are located at an outer edge of the substrate.

7. The RFID device of claim 6, wherein the first plurality of vias are aligned with one another along the outer edge.

8. The RFID device of claim 1, wherein the second antenna section further comprises:
at least one via that extends through the substrate to the third antenna section.

9. The RFID device of claim 8, wherein the at least one via is a second plurality of vias separated from one another by the substrate and electrically connected to the second antenna section by respective second conductive traces on the first side of the substrate and electrically connected to the third antenna section.

10. The RFID device of claim 9, wherein the at least one via is a second plurality of vias that comprise at least one of i) through holes with conductive sidewalls to electrically connect the respective second conductive traces to the third antenna section and ii) through holes with opposing third and fourth conductive sidewall end sections separated from one another by the substrate, the third sidewall end sections being electrically connected to the second antenna section and the fourth sidewall end sections being electrically connected to the third antenna section, the third and fourth sidewall sections being electrically connectable by a conductive element to electrically connect the respective second conductive traces to the third antenna section.

11. The RFID device of claim 10, wherein a location of each of the second plurality of vias is associated with one of the multiple different operating frequencies of the antenna.

12. A tunable antenna for an RFID device, comprising:
a first antenna plate on a first side of a substrate, the first antenna plate including a first plurality of vias that extend through the substrate from the first side of the substrate to a second side of the substrate and are electrically connected to the first antenna plate;
a second antenna plate on the first side of the substrate and separated from the first antenna plate by a portion of the substrate; and
a third antenna plate on at least the second side of the substrate, the third antenna plate configured to electrically connect the first plurality of vias to the second antenna plate,
wherein a location of each of the first plurality of vias is associated with one of multiple different operating frequencies of the tunable antenna,
wherein the multiple different operating frequencies include an initial operating frequency associated with one of the first plurality of vias, and
wherein the initial operating frequency is greater than a remainder of the multiple different operating frequencies that are associated with remaining ones of the first plurality of vias.

13. The tunable antenna of claim 12, wherein the first plurality of vias are aligned with one another along an outer edge of the substrate.

14. The tunable antenna of claim 12, wherein the second antenna plate further comprises:
a second plurality of vias that extend through the substrate from the first side to the second side and electrically connect the second and third antenna plates.

15. The tunable antenna of claim 14, wherein the first plurality of vias are separated from one another by the substrate and electrically connected to the first antenna plate by first respective conductive traces on the first side of the substrate, wherein the second plurality of vias are separated from one another by the substrate and electrically connected to the second antenna plate by respective second conductive traces on the first side of the substrate, and wherein one or more of the first plurality of vias and the second plurality of vias comprise at least one of i) through holes with conductive sidewalls to electrically connect the first and second respective conductive traces to the third antenna plate and ii) through holes with opposing conductive sidewall end sections separated from one another by the substrate, the sidewall end sections being electrically connectable by a conductive element to electrically connect one of the first and second respective traces to the third antenna plate.

16. A method of manufacturing an RFID device, comprising:
  forming a first antenna plate of an antenna on a first surface of a substrate;
  forming a second antenna plate of the antenna on the first surface of the substrate such that the second antenna plate and the first antenna plate are electrically isolated from one another on the first surface;
  forming a first plurality of vias through the substrate at locations on the substrate associated with different operating frequencies of the antenna, the first plurality of vias being electrically connected to the first antenna plate; and
  forming a third antenna plate of the antenna on a second surface of the substrate that is opposite to the first surface such that the third antenna plate electrically connects the first plurality of vias to the second antenna plate,
  wherein the different operating frequencies include an initial operating frequency associated with one of the first plurality of vias, and
  wherein the initial operating frequency is greater than a remainder of the different operating frequencies that are associated with remaining ones of the first plurality of vias.

17. The method of claim 16, wherein the forming the first antenna plate includes forming a conductive material on sidewalls of the first plurality of vias.

18. The method of claim 17, further comprising:
  changing an electrical connection between the conductive material and the first antenna plate to adjust the initial operating frequency of the antenna to one of the remainder of the different operating frequencies.

19. The method of claim 18, wherein the changing the electrical connection includes at least one of i) removing a conductive trace that connects the first antenna plate to the conductive material, ii) removing the conductive material on the sidewalls, iii) inserting a conductive element into at least one of the first plurality of vias, and iv) removing a conductive element from at least one of the first plurality of vias.

20. The method of claim 16, further comprising:
  forming a second plurality of vias through the substrate at locations on the substrate associated with the different operating frequencies of the antenna, wherein the forming the second antenna plate includes forming a conductive material on sidewalls of the second plurality of vias, and wherein the forming the second antenna plate includes electrically connecting the second antenna plate to the second plurality of vias; and
  changing an electrical connection between the conductive material and the second antenna plate to adjust the initial operating frequency of the antenna to one of the remainder of the different operating frequencies by at least one of i) removing a conductive trace that connects the second antenna plate to the conductive material, ii) removing the conductive material on the sidewalls, iii) inserting a conductive element into at least one of the second plurality of vias, and iv) removing a conductive element from at least one of the second plurality of vias.

* * * * *